(No Model.)
A. VAN GUYSLING.
OSCILLATING ENGINE.
No. 336,454. Patented Feb. 16, 1886.
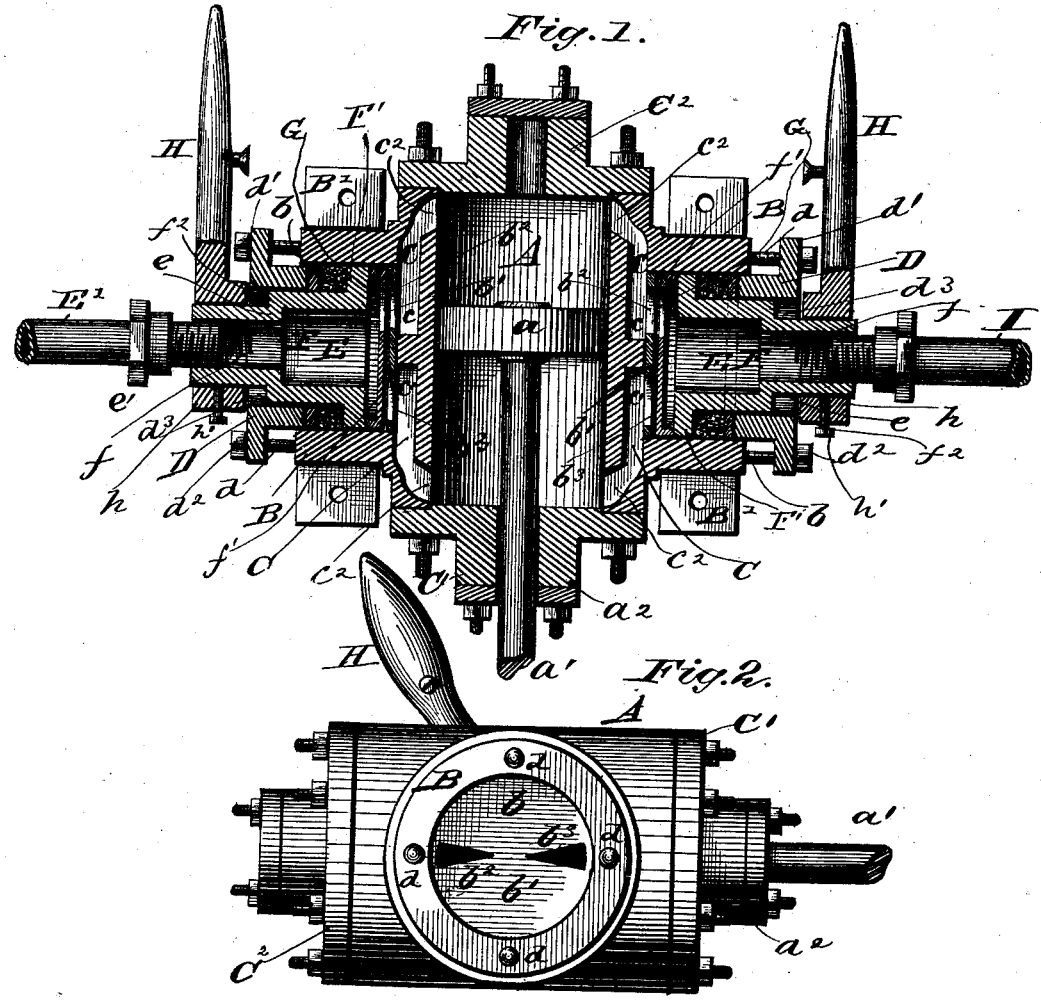
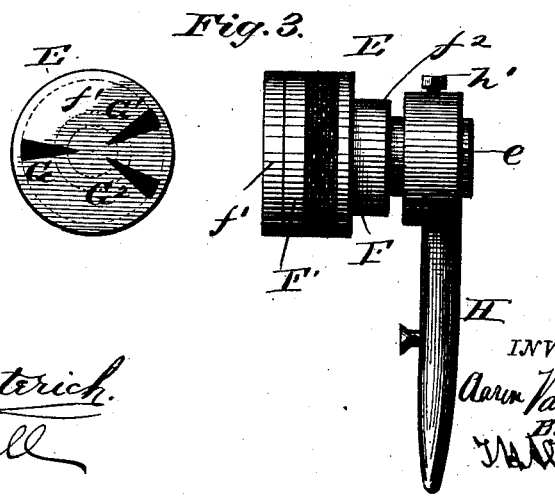
WITNESSES
Phil C. Dieterich.
A. E. Sowell
INVENTOR
Aaron Van Guysling
By: J. B. Alexander
Attorney

United States Patent Office.

AARON VAN GUYSLING, OF WEST ALBANY, NEW YORK.

OSCILLATING ENGINE.

SPECIFICATION forming part of Letters Patent No. 336,454, dated February 16, 1886.

Application filed November 23, 1885. Serial No. 183,731. (No model.)

*To all whom it may concern:*

Be it known that I, AARON VAN GUYSLING, of West Albany, in the county of Albany and State of New York, have invented certain new and useful Improvements in Oscillating Engines; and I do hereby declare that the following is a full, clear, and exact description thereof, reference being had to the accompanying drawings, and to the letters of reference marked thereon, which form part of this specification, in which—

Figure 1 is a horizontal section of the steam cylinder and valves. Fig. 2 is a side view of the steam-cylinder with parts removed to show the ports connecting with that side of the cylinder. Fig. 3 is a detail view of the valve.

This invention relates to improvements in oscillating engines; and it appertains particularly to the construction of the supply and exhaust ports of the cylinder, and the manner of reversing the engine, as hereinafter described, and pointed out in the appended claims.

In the accompanying drawings, A designates the cylinder turning on the hollow trunnions B B, which are supported in bearings B' in standards rising from the bed of the engine.

$a$ is the piston reciprocating in the cylinder A, and $a'$ the piston-rod, passing through the stuffing-box $a^2$, of ordinary construction, on the front plate of the cylinder.

Each of the trunnions B has within it the cylindrical chamber $b$, which has on its inner side the plate $b'$, provided with the diametrically-opposite ports $b^2$ $b^3$. The said ports run from near the center to near the circumference of the plate $b'$, and their side edges lie in radial lines of the plate $b'$, as shown.

C C are passages which run from chambers $c$ $c'$ in each trunnion to the inner side of the plate or wall $b'$ to the ends of the cylinder and open at orifices $c^2$ $c^2$, near the cylinder-heads. The two chambers $c$ $c'$ of each trunnion do not communicate with each other, and the passages C C are made in the wall of the cylinder A, so as not to interfere with the circularity of its bore.

The front and end plates or heads of the cylinder are respectively designated by the letters C' C², and properly bolted to the ends, as shown. Each trunnion B is identical in construction with its fellow, and a description of one only and the connecting parts thereof is necessary.

$d$ $d$ are a suitable number of rods tapped at each end. One end of each rod engages in a threaded recess in the rim or edge of the trunnion, the said openings being equidistant.

D is a block, the hub of which enters a short distance and fits within the bore of the trunnion, and has around its outer end the circumferential flange $d'$, through threaded openings in which the outer ends of the rods $d$ pass. The block is kept in place on the end of the trunnion by the nuts $d^2$ $d^2$, which engage on the rods $d$, as shown.

$d^3$ is the central circular opening in the block D, through which the stem $e$ of the valve-block E passes. The outer end of the bore of the stem $e$ is internally threaded and connected by a proper coupling-joint, $e'$, to a steam-pipe, E'.

F is a cylindrical steam-chamber on the inner end of the valve-block. The said chamber F communicates with the steam-pipe E' through the bore $f$ of the stem of the valve-block E. The inner face-plate, $f'$, of the chamber F lies upon the plate $b'$ of the chamber $b$ in the trunnion.

F' is a plate, the central circular opening of which fits upon the stem of the valve-block and is situated within the chamber $b$. The stems of the outer block between the inner face of said ring and the outer surface of the steam-chamber F is wrapped with proper packing, so as to form a steam-tight joint or stuffing-box within the chamber $b$.

$f^2$ is a circumferential shoulder on the stem $e$, which shoulder rests within the bore of the block D when the parts are in place.

The plate $f'$ is provided with three ports, G, G', and G², of similar size and shape to the ports $b^2$ $b^3$ of the plate $b'$. That diameter of the plate $f'$ which runs centrally through the port G has the similar ports, G' G², equally distant on each side of it, and on the side of plate $f'$ opposite that on which the port G is situated.

H is a handle, the hub $h$ of which fits on the stem $e$ outside of the block D, and has its inner edge abutting against the shoulder $f^2$.

$h'$ is a set-screw to secure the hub $h$ in place, as shown.

The blocks D, valve-blocks E, and the corresponding parts of the same in each trunnion are identical in construction, but steam is received through the trunnion on one side, and the exhaust takes place through the opposite trunnion, which is connected with an exhaust-pipe, I, or discharges into the air through the end of the trunnion. A number of similar cylinders may be made to coact by connecting their handles or levers H by rods so that the port-valves on both sides can be all moved together. In a single cylinder the piston-rod connects with a rotatory disk in the usual manner, and the steam is taken through the pipe E' from the boiler.

When the engine is running in one direction, the steam-port G lies over the chamber $c$ and communicates therewith through the port $b^2$ as the cylinder oscillates, and the port G' lies over and communicates similarly with the chamber $c'$ through the port $b^3$. The exhaust-ports having the same letters and of identical construction also communicate so that one end of the cylinder is receiving steam, and the other end exhausting simultaneously. To reverse, the handle H is turned with the valve-block in such manner that the port G will communicate with the chambers $c'$ through the ports $b^3$, and the ports $G^2$ will communicate with the chambers $c$ through the ports $b^2$.

The invention is especially designed for use in connection with pumps, the pump-cylinders being connected directly with the main shaft of the engine, and actuated by the engine, as described.

Having described my invention, I claim—

1. The combination of the oscillating cylinder and piston moving therein, the hollow trunnions on opposite sides of the cylinder, the valve-blocks fitting and turning within the trunnion, and having the ports G G' $G^2$, the plates secured within the trunnions and provided with the ports $b^2$ $b^3$, and the handles H on the outer ends of the rotary blocks, for the purpose of turning the same and causing the engine to reverse, substantially as specified.

2. In an oscillating steam-engine, the combination of the cylinder A, the piston $a$, the trunnions B, turning in the bearings B' B', and provided with the chambers $c$ $c'$, and plates $b'$, having the ports $b^2$ $b^3$, the blocks D, secured, as described, to the trunnions, the valve-blocks E, provided with the chambers F, having the ports G G' $G^2$ on their inner walls, the disks or plates F', and the handles H, removably attached to the stems $e$ of the valve-blocks, all constructed and arranged substantially as and for the purposes described.

In testimony that I claim the foregoing as my own I affix my signature in presence of two witnesses.

AARON VAN GUYSLING.

Witnesses:
HENRY T. SANFORD,
G. D. VAN VLIET.